United States Patent
Miyazaki et al.

(10) Patent No.: US 7,382,688 B2
(45) Date of Patent: Jun. 3, 2008

(54) ULTRASONIC TRANSDUCER, ULTRASONIC SPEAKER, AND METHOD OF CONTROLLING THE DRIVING OF ULTRASONIC TRANSDUCER

(75) Inventors: Shinichi Miyazaki, Suwa (JP); Akihito Uetake, Hachioji (JP)

(73) Assignee: Seiko Epson Corporation (JP)

( * ) Notice: Subject to any disclaimer, the term of this patent is extended or adjusted under 35 U.S.C. 154(b) by 494 days.

(21) Appl. No.: 11/155,023

(22) Filed: Jun. 16, 2005

(65) Prior Publication Data

US 2005/0281419 A1 Dec. 22, 2005

(30) Foreign Application Priority Data

Jun. 18, 2004 (JP) ............................. 2004-181066

(51) Int. Cl.
*H02N 1/00* (2006.01)
*H04R 25/00* (2006.01)
*A61B 8/00* (2006.01)

(52) U.S. Cl. ...................................... 367/137
(58) Field of Classification Search ................ 367/137; 381/191; 310/316.01
See application file for complete search history.

(56) References Cited

U.S. PATENT DOCUMENTS

| 3,604,251 | A  | * | 9/1971  | Dixon ........................ 381/191 |
| 6,328,696 | B1 | * | 12/2001 | Fraser ........................ 367/118 |
| 6,443,901 | B1 | * | 9/2002  | Fraser ........................ 600/459 |
| 6,795,374 | B2 | * | 9/2004  | Barnes et al. ................ 367/138 |
| 7,275,298 | B2 | * | 10/2007 | Schindel ..................... 367/140 |
| 2002/0135272 | A1 | * | 9/2002 | Toda ........................... 310/334 |
| 2003/0048698 | A1 | * | 3/2003 | Barnes et al. ................ 367/181 |

FOREIGN PATENT DOCUMENTS

| JP | 39-8261 | | 5/1939 |
| JP | 01312485 A | * | 12/1989 |
| JP | 2003-047085 | | 2/2003 |
| JP | 2004-112212 | | 4/2004 |

OTHER PUBLICATIONS

Communication from Japanese Patent Office regarding related application.

* cited by examiner

*Primary Examiner*—Dan Pihulic
(74) *Attorney, Agent, or Firm*—Harness, Dickey & Pierce, P.L.C.

(57) ABSTRACT

An electrostatic ultrasonic transducer includes a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave. Part of the pair of fixed electrodes includes s driving fixed electrode for driving the ultrasonic transducer, and the other part includes a detecting fixed electrode for detecting the amplitude of the diaphragm. The ultrasonic transducer includes a control unit that controls the vibration of the diaphragm so that the amplitude is proportional to the input signal based on the amplitude of the diaphragm detected by the detecting fixed electrode.

15 Claims, 13 Drawing Sheets

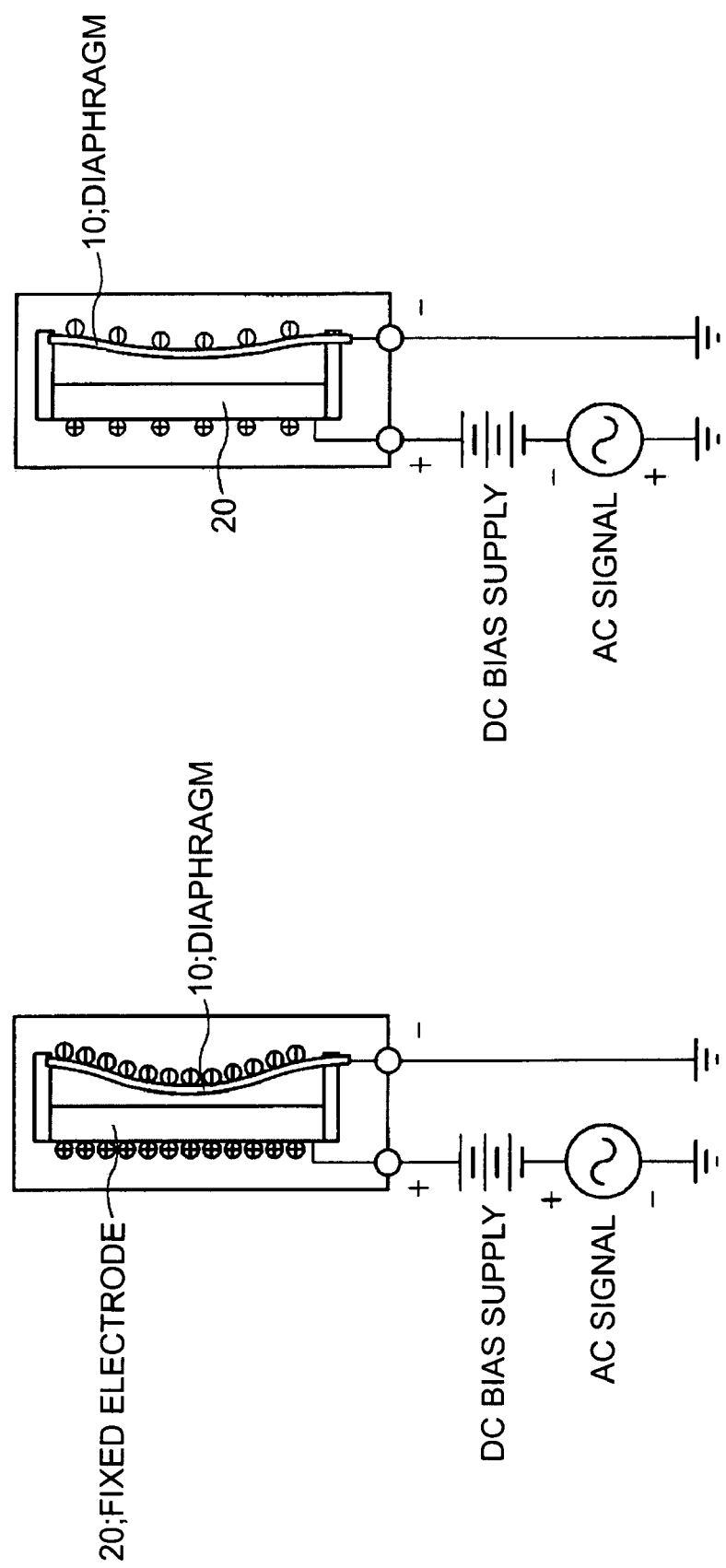

ULTRASONIC TRANSDUCER, ULTRASONIC SPEAKER, AND METHOD OF CONTROLLING THE DRIVING OF ULTRASONIC TRANSDUCER

RELATED APPLICATIONS

This application claims priority to Japanese Patent Application No. 2004-181066 filed Jun. 18, 2004 which is hereby expressly incorporated by reference herein in its entirety.

BACKGROUND

1. Technical Field

The present invention relates to an ultrasonic transducer, an ultrasonic speaker, and a method of controlling the driving of the ultrasonic transducer, and in particular, it relates to an electrostatic ultrasonic transducer, an ultrasonic speaker, and a method of controlling the driving of the ultrasonic transducer capable of outputting sound waves in response to input signals with high fidelity.

2. Related Art

Typical ultrasonic transducers include a piezoelectric transducer and an electrostatic transducer. The piezoelectric transducer uses a piezoelectric element such as piezo as a vibrator and is a resonant transducer of the type that operates using its resonant frequency band. Thus, it has the characteristic of generating a high sound pressure efficiently but having a narrow-band frequency response. On the other hand, the electrostatic transducer is of the type that vibrates a thin electrode layer by applying electrostatic force between a fixed electrode and the electrode layer and has a wide-band frequency response.

When a modulated wave (sound wave) generated by modulating the amplitude of a high sound-pressure ultrasonic carrier wave by an audio-range signal is radiated into air, the sound speed is high at a high sound pressure and low at a low sound pressure, generating distortion in the waveform as the sound wave propagates in the air. It is known that the distortion is accumulated as the sound wave propagates in the air, attenuating the carrier wave component gradually, so that the audio-range signal component used for modulation is auto-demodulated. The phenomenon is called a parametric array. Since the auto-demodulated audio sound has high directivity because of ultrasonic transmission, a speaker based on the principle is called a parametric speaker or a superdirectivity speaker (ultrasonic speaker).

Since a superdirectivity speaker (ultrasonic speaker) needs a high sound pressure, related-art superdirectivity speakers generally use a resonant transducer (for example, refer to JP-A-2003-47085 and JP-A-2004-112212). The related-art superdirectivity speakers, however, are regarded as having a lower reproduction sound quality than loud speakers, so that they are used only for audio application such as local announcement and exhibition commentary. Thus, the resonant transducer has a narrow-band frequency response with a limited drive frequency, thus having the problems that it is difficult to improve the reproduction sound quality and to control the reproduction range. It also has the problem of being sensitive to an excessive input, tending to damage the elements, thus requiring some cautions.

On the other hand, an electrostatic transducer has the characteristic of generating a lower sound pressure per unit area than that of the resonant transducer but having a wide-band frequency response. Accordingly, it can easily improve the reproduction sound quality and control the reproduction range. Also, since it has a more flexible vibrator (film) than that of the resonant transducer, it is hardly damaged by an excessive input, thus having the advantage of not needing nervous (careful) handling as with the resonant transducer.

Thus, it is desirable to construct the superdirectivity speaker using the electrostatic transducer in view of improvement in reproduction sound quality and ease of handing.

The electrostatic transducer is roughly classified into two types: a pull type; and a push-pull type, in terms of structure. Their advantages and disadvantages are as follows.

FIGS. 11A and 11B are diagrams for explaining the concept of driving a pull electrostatic ultrasonic transducer. An alternating current signal that is superimposed on a direct-current bias outputted from a DC bias supply is applied between a diaphragm 10 formed by evaporating a conducting layer on an insulating film and a fixed electrode 20, whereby the diaphragm 10 is vibrated to output ultrasonic waves.

FIG. 11A shows the amplitude of the diaphragm 10 to which the positive (+) output of the alternating current signal superimposed on the direct current bias is applied. FIG. 11B shows the amplitude of the diaphragm 10 to which the negative (−) output of the alternating current signal superimposed on the direct current bias is applied.

In the state of FIG. 11A, the potential difference between the fixed electrode 20 and the diaphragm 10 increases, applying high electrostatic force between the fixed electrode 20 and the diaphragm 10 to draw the center of the diaphragm 10 toward the fixed electrode 20. In the state of FIG. 11B, the potential difference between the fixed electrode 20 and the diaphragm 10 decreases, decreasing the electrostatic force (attracting force) between the fixed electrode 20 and the diaphragm 10 to draw back the center of the diaphragm 10 in the direction opposite to the fixed electrode 20 by elastic restoration. Thus the diaphragm 10 vibrates in response to alternating signals, thereby generating ultrasonic waves.

Unlike the push-pull electrostatic ultrasonic transducer (to be described later), the pull electrostatic ultrasonic transducer does not need to have a through hole in the fixed electrode for sound waves to pass through, thus having the advantage of having a high aperture ratio to facilitate obtaining a high sound pressure. On the other hand, it has the disadvantage of having an output waveform with large distortion because its vibration conductive component is only the electrostatic attracting force and the elastic restoring force of the diaphragm.

FIGS. 12A to 12C are diagrams for explaining the concept of driving a push-pull electrostatic ultrasonic transducer. The push-pull electrostatic ultrasonic transducer has upper fixed electrodes 20a and lower fixed electrodes 20b opposed to the diaphragm 10. A positive (+) DC bias is applied to the diaphragm 10 from the DC bias supply, and an alternating current signal is applied between the upper fixed electrodes 20a and the lower fixed electrodes 20b.

FIG. 12A shows the amplitude of the diaphragm 10 when the alternating signal is zero (0). The diaphragm 10 is in the neutral position (in the center of the upper fixed electrodes 20a and the lower fixed electrodes 20b). FIG. 12B shows the amplitude of the diaphragm 10 when the positive (+) voltage of the alternating current signal is applied to the upper fixed electrodes 20a and the negative (−) voltage of the alternating current signal is applied to the lower fixed electrodes 20b. The center of the diaphragm 10 is drawn toward the lower fixed electrodes 20b by the electrostatic force. (attracting force) between it and the lower fixed electrodes 20b and the electrostatic force (repulsion) between it and the upper fixed electrodes 20a.

FIG. 12C shows the amplitude of the diaphragm 10 when the positive (+) voltage of the alternating current signal is applied to the lower fixed electrodes 20b. The center of the diaphragm 10 is drawn toward the upper fixed electrodes 20a by the electrostatic force (attracting force) between it and the upper fixed electrodes 20a and the electrostatic force (repulsion) between it and the lower fixed electrodes 20b. Thus the diaphragm 10 vibrates in response to alternating signals, thereby outputting ultrasonic waves.

The push-pull electrostatic ultrasonic transducer has the advantage of having an output waveform with small distortion because both the electrostatic attraction force and the electrostatic repulsion force are applied to the diaphragm, or symmetrically positive and negative electrostatic force is applied. On the other hand, it has the disadvantage of having difficulty in obtaining a high sound pressure, because of a low aperture ratio since sound waves are outputted through a through hole in the fixed electrode.

When the electrostatic ultrasonic transducer is used for a superdirectivity speaker, even when an ideally amplitude modulated wave in an ultrasonic band is inputted to the speaker, if the asymmetrically positive and negative distortion component of the waveform (carrier wave) outputted from the transducer is large, the distortion component becomes an audible component, so that, in addition to the ultrasonic component, the audible sound is outputted directly from the speaker, thus posing the specific problem of decreasing the directivity in audibility. This is because the electrostatic transducer has the sound-pressure characteristics of a wide frequency band (even if an audible sound itself is inputted directly, a good sound pressure can be outputted), which is a problem peculiar to a transducer with wide-band frequency characteristic. Accordingly, it is desirable to use the push-pull type with lower distortion of the output waveform than that of the pull type.

A case in which the push-pull transducer is driven by applying a sinusoidal driving signal will now be considered. When all the electrical characteristics and the mechanical shape and size of the upper electrodes and the lower electrodes of the push-pull transducer are the same, or when they have a completely vertically symmetrical structure, the diaphragm vibrates symmetrically positively and negatively (vertically). (For example, the positive amplitude and the negative amplitude are equal, as indicated by the dotted line in FIG. 13.)

However, when there are errors in shape, size, and position and electrical characteristics between the upper electrodes and the lower electrodes, the electrostatic force that acts actually on the diaphragm are different between the upper electrodes and the lower electrodes, even if the amplitudes of the driving signals supplied to the upper electrodes and the lower electrodes are equal to each other (indicated by the dotted line), as shown in FIG. 13. The diaphragm therefore does not vibrate vertically symmetrically (indicated by the solid line).

Accordingly, the super-directivity speaker using the related-art push-pull transducer, if it has an error in manufacturing, a positioning error, and variations in electrical characteristics, generates asymmetrically positive and negative distortion in the output waveform, resulting in a decrease in audible directivity.

SUMMARY

An advantage of the invention is to provide an ultrasonic transducer, an ultrasonic speaker, and a method of controlling the driving of the ultrasonic transducer, in which the asymmetrically positive and negative distortion of the outputted vibration waveform is suppressed to decrease audible components generated directly from the transducer, thereby achieving a high-directivity speaker.

According to a first aspect of the invention, there is provided an electrostatic ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave. Part of the pair of fixed electrodes includes a driving fixed electrode for driving the ultrasonic transducer, and the other part includes a detecting fixed electrode for detecting the amplitude of the diaphragm. The ultrasonic transducer includes a control unit that controls the vibration of the diaphragm so that the amplitude of the diaphragm is proportional to the input signal on the basis of the amplitude of the diaphragm detected by the detecting fixed electrode.

With such a structure, part of the pair of first and second fixed electrodes which are opposed to the corresponding surface of the diaphragm is used as a driving electrode and the other part as a detecting electrode (electrostatic sensor). The signal to be applied to the respective driving electrodes of the first and second fixed electrodes are feedback-controlled (the gain is controlled) so that the diaphragm vibrates symmetrically on both sides (symmetrically for positive and negative values of the input signal).

Thus, the push-pull electrostatic ultrasonic transducer is allowed, even if a process error in manufacturing, a positioning error, and variations in electrical characteristics occur between the pair of fixed electrodes opposed to the diaphragm of the transducer, to suppress asymmetrical positive and negative distortion of the output vibration waveform, reducing the audible component that is generated directly from the transducer, thus achieving a higher-directivity speaker.

It is preferable that each of the pair of fixed electrodes be an array of a plurality of electrodes that is insulated from one another, part of the electrode array serving as the driving fixed electrode, and the other part of the fixed electrode serving as the amplitude-detecting fixed electrode.

With such a structure, the fixed electrode is an array of a plurality of electrodes that is insulated from one another. Accordingly, the ultrasonic transducer can be constructed of a combination of electrode arrays. Ultrasonic transducers of various sizes and shapes can therefore be manufactured depending on the combination of the electrode arrays. The electrode arrays serving as the detecting fixed electrodes can be arranged in desired positions. Also, multiple detecting fixed electrodes can be provided.

It is preferable that the diaphragm has a structure in which both sides of a conducting electrode layer are coated with an insulating layer.

Thus, the diaphragm has a structure in which a conducting layer (electrode layer) is sandwiched between insulating layers. Accordingly, there is no need to insulate the fixed electrodes, facilitating the manufacture of the ultrasonic transducer. This also facilitates achieving the symmetric arrangement of the fixed electrodes about the diaphragm.

It is preferable that the diaphragm has a structure in which one or both sides of the diaphragm are coated with a conducting layer and the surface of the fixed electrode which faces the conducting layer of the diaphragm has an insulating layer.

Thus, the diaphragm has a structure in which one or both sides of the diaphragm are coated with a conducting layer and the surface of the fixed electrode which faces the conducting layer has an insulating layer. This facilitates the manufacture of the diaphragm.

It is preferable that the ultrasonic transducer further include a first amplitude detection unit that detects the amplitude voltage level of the diaphragm for the first fixed electrode by measuring the voltage between the detecting fixed electrode of the first fixed electrode of the pair of fixed electrodes and the diaphragm, and a second amplitude detection unit that detects the amplitude voltage level of the diaphragm for the second fixed electrode by measuring the voltage between the detecting fixed electrode of the second fixed electrode of the pair of fixed electrodes and the diaphragm.

With such a structure, the vibration (amplitude) of the diaphragm relative to the first fixed electrode is detected by measuring the voltage between the first detecting fixed electrode and the conducting layer of the diaphragm by the first amplitude detection unit by using the first detecting fixed electrode and the conducting layer as an electrostatic sensor; and the vibration (amplitude) of the diaphragm relative to the second fixed electrode is detected by measuring the voltage between the second detecting fixed electrode and the conducting layer of the diaphragm by the second amplitude detection unit by using the second detecting fixed electrode and the conducting layer as an electrostatic sensor.

Thus, the amplitude of the diaphragm relative to the first and second fixed electrodes can be detected and so the asymmetrical distortion of the diaphragm can be detected.

It is preferable that the ultrasonic transducer further include a first error detection unit that detects the error between the amplitude voltage level detected by the first amplitude detection unit and a target voltage level, a second error detection unit that detects the error between the amplitude voltage level detected by the second amplitude detection unit and a target voltage level, a first variable-gain control unit that controls the gain of the alternating current signal applied to the driving fixed electrode of the first fixed electrode depending on the error detected by the first error detection unit, and a second variable-gain control unit that controls the gain of the alternating current signal applied to the driving fixed electrode of the second fixed electrode depending on the error detected by the second error detection unit.

With such a structure, the error between the amplitude voltage level detected by the first amplitude detection unit and a target voltage level is detected by the first error detection unit. Also, the error between the amplitude voltage level detected by the second amplitude detection unit and a target voltage level is detected by the second error detection unit. The gain of the alternating current signal to be applied to the first fixed electrode is controlled by the first variable-gain control unit depending on the error detected by the first error detection unit. Also, the gain of the alternating current signal to be applied to the second fixed electrode is controlled by the second variable-gain control unit depending on the error detected by the second error detection unit.

Thus, the gains of the positive and negative signals for driving the ultrasonic transducer can be controlled and as such, the asymmetrical positive and negative distortion of the ultrasonic transducer can be reduced.

According to a second aspect of the invention, there is provided an ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave. Part of the pair of fixed electrodes includes a driving fixed electrode for driving the ultrasonic transducer, and the other part includes a detecting fixed electrode for detecting the amplitude of the diaphragm. The ultrasonic transducer further includes a control unit that controls the vibration of the diaphragm so that the amplitude of the diaphragm is proportional to the input signal by adjusting the gaps between the first and second fixed electrodes and the diaphragm on the basis of the amplitude of the diaphragm detected by the detecting fixed electrode.

Thus, part of the pair of first and second fixed electrodes which are opposed to the corresponding surfaces of the diaphragm is used as a driving electrode and the other part as a detecting electrode (electrostatic sensor). The gaps between the first and second fixed electrodes and the diaphragm are adjusted by the actuators on the basis of the amplitude information of the diaphragm detected by the respective detecting fixed electrodes of the first and second fixed electrodes.

Thus, the push-pull electrostatic ultrasonic transducer is allowed, even if a process error in manufacturing, a positioning error, and variations in electrical characteristics occur between the pair of fixed electrodes opposed to the diaphragm of the transducer, to decrease the asymmetrical positive and negative distortion of the output vibration waveform by adjusting the gaps between the diaphragm and the fixed electrodes by the actuators, thereby reducing the audible component that is generated directly from the transducer. Thus a higher-directivity speaker can be achieved.

It is preferable that each of the pair of fixed electrodes be an array of a plurality of electrodes that is insulated from one another, part of the electrode array serving as the driving fixed electrode, and the other part of the fixed electrode serving as the amplitude-detecting fixed electrode.

With such a structure, the fixed electrode is an array of a plurality of electrodes that is insulated from one another. Accordingly, the ultrasonic transducer can be constructed of a combination of electrode arrays. Ultrasonic transducers of various sizes and shapes can be manufactured depending on the combination of the electrode arrays. The electrode arrays serving as the detecting fixed electrodes can be arranged in desired positions. Also, multiple detecting fixed electrodes can be provided.

It is preferable that the diaphragm have a structure in which both sides of a conducting electrode layer are coated with an insulating layer.

Thus, the diaphragm has a structure in which a conducting layer (electrode layer) is sandwiched between insulating layers. Accordingly, there is no need to insulate the fixed electrodes, facilitating the manufacture of the ultrasonic transducer. This also facilitates achieving the symmetric arrangement of the fixed electrodes about the diaphragm.

It is preferable that the diaphragm have a structure in which one or both sides of the diaphragm are coated with a conducting layer and the surface of the fixed electrode which faces the conducting layer of the diaphragm has an insulating layer.

Thus, the diaphragm has a structure in which one or both sides of the diaphragm are coated with a conducting layer and the surface of the fixed electrode which faces the conducting layer has an insulating layer. This facilitates the manufacture of the diaphragm.

It is preferable that the ultrasonic transducer further include a first amplitude detection unit that detects the amplitude voltage level of the diaphragm for the first fixed electrode by measuring the voltage between the detecting fixed electrode of the first fixed electrode of the pair of fixed electrodes and the diaphragm, a second amplitude detection unit that detects the amplitude voltage level of the diaphragm for the second fixed electrode by measuring the voltage between the detecting fixed electrode of the second fixed electrode of the pair of fixed electrodes and the diaphragm, a first error detection unit that detects the error between the amplitude voltage level detected by the first amplitude detection unit and a target voltage level, a second error detection unit that detects the error between the amplitude voltage level detected by the second amplitude detection unit and a target voltage level, a first gap control unit that adjusts the gap between the first fixed electrode and the diaphragm by an actuator on the basis of the error detected by the first error detection unit, and a second gap control unit that adjusts the gap between the second fixed electrode and the diaphragm by an actuator on the basis of the error detected by the second error detection unit.

With such a structure, the vibration (amplitude) of the diaphragm relative to the first fixed electrode is detected by measuring the voltage between the first detecting fixed electrode and the conducting layer of the diaphragm by the first amplitude detection unit by using the first detecting fixed electrode and the conducting layer as an electrostatic sensor; and the vibration (amplitude) of the diaphragm relative to the second fixed electrode is detected by measuring the voltage between the second detecting fixed electrode and the conducting layer of the diaphragm by the second amplitude detection unit by using the second detecting fixed electrode and the conducting layer as an electrostatic sensor. The error between the amplitude voltage level detected by the first amplitude detection unit and a target voltage level is detected by the first error detection unit. Also, the error between the amplitude voltage level detected by the second amplitude detection unit and a target voltage level is detected by the second error detection unit. The gap between the first fixed electrode and the diaphragm is adjusted by the actuator on the basis of the error detected by the first error detection unit. The gap between the second fixed electrode and the diaphragm is adjusted by the actuator on the basis of the error detected by the second error detection unit.

Thus, the push-pull electrostatic ultrasonic transducer is allowed, even if a process error in manufacturing, a positioning error, and variations in electrical characteristics occur between the pair of fixed electrodes opposed to the diaphragm of the transducer, to decrease the asymmetrical positive and negative distortion of the output vibration waveform by adjusting the gaps between the diaphragm and the fixed electrodes by the actuators, thereby reducing the audible component that is generated directly from the transducer. Thus a higher-directivity speaker can be achieved.

It is preferable that the ultrasonic transducer further include a first amplitude detection unit that detects the amplitude voltage level of the diaphragm for the first fixed electrode by measuring the voltage between the detecting fixed electrode of the first fixed electrode of the pair of fixed electrodes and the diaphragm, a second amplitude detection unit that detects the amplitude voltage level of the diaphragm for the second fixed electrode by measuring the voltage between the detecting fixed electrode of the second fixed electrode of the pair of fixed electrodes and the diaphragm, a first error detection unit that detects the error between the amplitude voltage level detected by the first amplitude detection unit and a target voltage level, a second error detection unit that detects the error between the amplitude voltage level detected by the second amplitude detection unit and a target voltage level, a first variable-gain control unit that controls the gain of the alternating current signal applied to the driving fixed electrode of the first fixed electrode when the error detected by the first error detection unit is lower than a specified value, a second variable-gain control unit that controls the gain of the alternating current signal applied to the driving fixed electrode of the second fixed electrode when the error detected by the second error detection unit is lower than a specified value, a first gap control unit that adjusts the gap between the first fixed electrode and the diaphragm by an actuator when the error detected by the first error detection unit is higher than a specified value, and a second gap control unit that adjusts the gap between the second fixed electrode and the diaphragm by an actuator when the error detected by the second error detection unit is higher than a specified value.

Thus, the error between the amplitude voltage level of the first fixed electrode detected by the first amplitude detection unit and a target voltage level is detected by the first error detection unit. Also, the error between the amplitude voltage level of the second fixed electrode detected by the second amplitude measuring unit and a target voltage level is detected by the second error detection unit. The gain of the alternating current signal applied to the driving fixed electrode of the first fixed electrode is controlled by the first variable-gain control unit when the error detected by the first error detection unit is smaller than a specified value. The gain of the alternating current signal applied to the driving fixed electrode of the second fixed electrode is controlled by the second variable-gain control unit when the error detected by the second error detection unit is smaller than a specified value. The gap between the first fixed electrode and the diaphragm is adjusted by the actuator of the first gap control unit when the error detected by the first error detection unit is larger than a specified value. The gap between the second fixed electrode and the diaphragm is adjusted by the actuator of the second gap control unit when the error detected by the second error detection unit is larger than a specified value.

Thus, the push-pull electrostatic ultrasonic transducer is allowed, even if a process error in manufacturing, a positioning error, and variations in electrical characteristics occur between the pair of fixed electrodes opposed to the diaphragm of the transducer, to decrease the asymmetrical positive and negative distortion of the output vibration waveform by controlling the gain of the positive and negative signals for driving the ultrasonic transducer or by adjusting the gaps between the diaphragm and the fixed electrodes by the actuators.

An ultrasonic speaker according to a second aspect of the invention includes one of the above-described ultrasonic transducers, wherein a modulated wave generated by modulating the amplitude of an ultrasonic carrier wave by an audio-range signal can be provided.

Thus, an ultrasonic speaker capable of reproducing a high-directivity demodulated sound by using an ultrasonic transducer in which the asymmetrical positive and negative distortion of the output vibration waveform is reduced.

According to another aspect of the invention, there is provided a method of controlling the driving of an electrostatic ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave. The method includes forming part of the pair of fixed electrodes as a driving fixed electrodes for driving the ultrasonic transducer, and the other part as a detecting fixed electrode for detecting the amplitude of the diaphragm, and controlling the ultrasonic transducer so that the diaphragm vibrates such that the amplitude is proportional to the input signal on the basis of the amplitude of the diaphragm detected by the detecting fixed electrode.

With such a structure, part of the pair of first and second fixed electrodes which are opposed to the corresponding surfaces of the diaphragm is used as a driving electrode and the other part as a detecting electrode (electrostatic sensor). The signal to be applied to the respective driving electrodes of the first and second fixed electrodes are feedback-controlled (the gain is controlled) so that the diaphragm vibrates symmetrically on both sides (symmetrically for positive and negative values of the input signal) on the basis of the amplitude information of the diaphragm detected by the respective detecting fixed electrodes of the first and second fixed electrodes.

Thus, the push-pull electrostatic ultrasonic transducer is allowed, even if a process error in manufacturing, a positioning error, and variations in electrical characteristics occur between the pair of fixed electrodes opposed to the diaphragm of the transducer, to decrease the asymmetrical positive and negative distortion of the output vibration waveform, thereby reducing the audible component that is generated directly from the transducer. Thus a higher-directivity speaker can be achieved.

According to yet another aspect of the invention, there is provided a method of controlling the driving of an electrostatic ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave. The method includes forming part of the pair of fixed electrodes as a driving fixed electrodes for driving the ultrasonic transducer, and the other part as a detecting fixed electrode for detecting the amplitude of the diaphragm, and controlling the ultrasonic transducer so that the diaphragm vibrates such that the amplitude is proportional to the input signal by adjusting the gaps between the first and second fixed electrodes and the diaphragm on the basis of the amplitude of the diaphragm detected by the detecting fixed electrode.

Thus, part of the pair of first and second fixed electrodes which are opposed to the corresponding surfaces of the diaphragm is used as a driving electrode and the other part as a detecting electrode (electrostatic sensor). The gaps between the first and second fixed electrodes and the diaphragm are adjusted by the actuators on the basis of the amplitude information of the diaphragm detected by the respective detecting fixed electrodes of the first and second fixed electrodes.

Thus, the push-pull electrostatic ultrasonic transducer is allowed, even if a process error in manufacturing, a positioning error, and variations in electrical characteristics occur between the pair of fixed electrodes opposed to the diaphragm of the transducer, to decrease the asymmetrical positive and negative distortion of the output vibration waveform, thereby reducing the audible component that is generated directly from the transducer. Thus a higher-directivity speaker can be achieved.

BRIEF DESCRIPTION OF THE DRAWINGS

The invention will be described with reference to the accompanying drawings, wherein like numbers reference like elements, and wherein:

FIG. 11A is an explanatory diagram of the concept of driving a pull electrostatic ultrasonic transducer;

FIG. 11B is an explanatory diagram of the concept of driving a pull electrostatic ultrasonic transducer;

DETAILED DESCRIPTION

Preferred embodiments of the invention will be described hereinbelow with reference to the drawings.

Structure of Ultrasonic Transducer of the Invention

Figure 1:
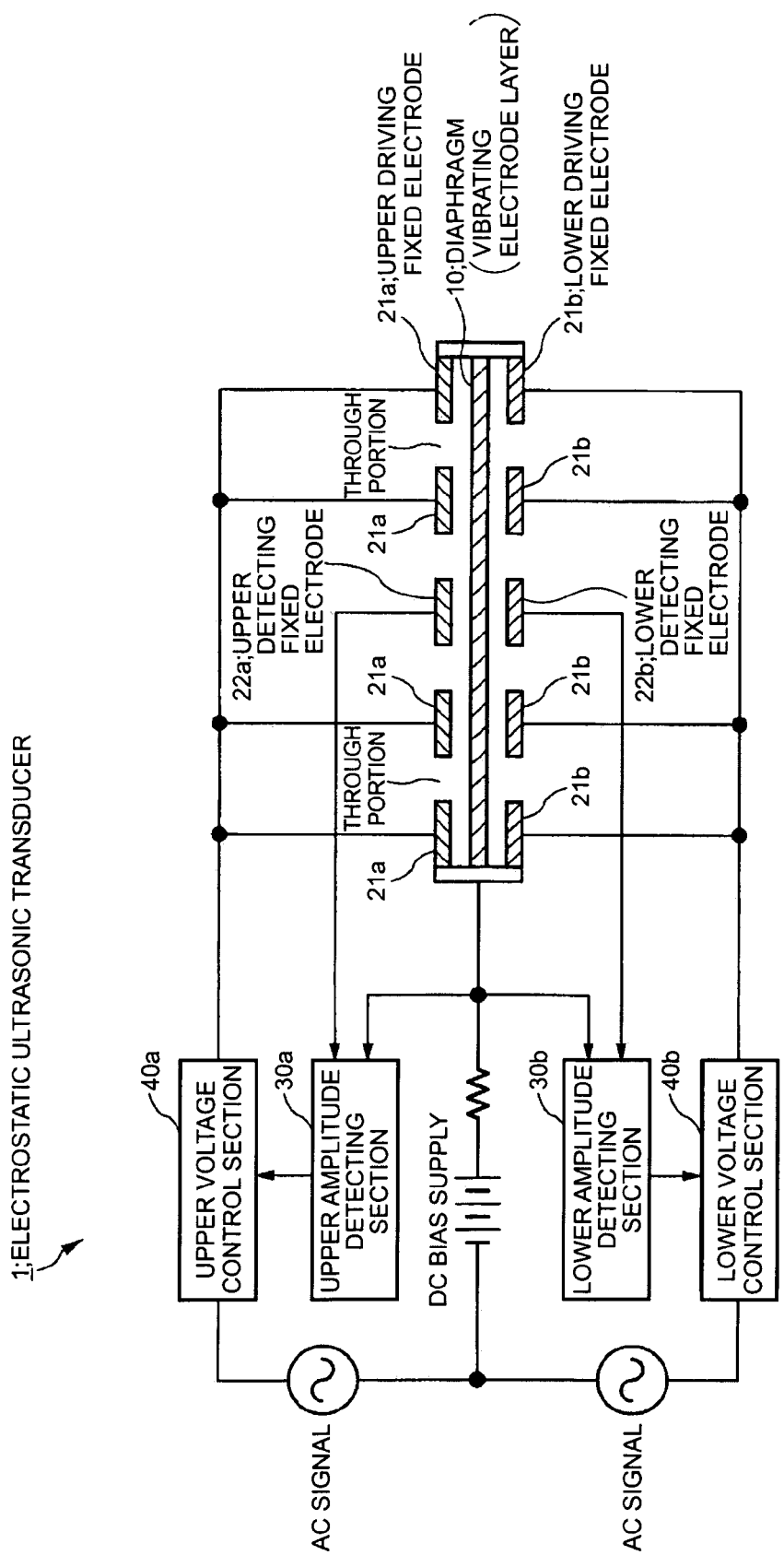
FIG. 1 is a diagram of a first structural example of an ultrasonic transducer of the invention.

FIG. 1 is a sectional view of a first structural example of an ultrasonic transducer of the invention. The ultrasonic transducer 1 shown in FIG. 1 is a push-pull electrostatic ultrasonic transducer, in which a diaphragm (vibrating electrode layer) 10 having a conducting layer is sandwiched between upper fixed electrodes (upper driving fixed electrodes 21*a* and an upper detecting fixed electrode 22*a*) and lower fixed electrodes (lower driving fixed electrodes 21*b* and a lower detecting fixed electrode 22*b*). The upper fixed electrodes (first fixed electrodes) and the lower fixed electrodes (second fixed electrodes) are arranged so as to face both sides of the diaphragm 10. In the ultrasonic transducer 1 shown in FIG. 1, the fixed electrodes 21*a* and 22*a* and the fixed electrodes 21*b* and 22*b* are symmetric with respect to the diaphragm 10. The fixed electrodes 21*a* and 22*a* are on the upper side and the fixed electrodes 21*b* and 22*b* are on the lower side with respect to the diaphragm 10 for the convenience of description (the same applies to the other drawings).

The upper driving fixed electrode 21*a* and the lower driving fixed electrode 21*b* shown in FIG. 1 are collectively called a driving fixed electrode 21. The upper detecting fixed electrode 22*a* and the lower detecting fixed electrode 22*b* are collectively called a detecting fixed electrode 22. The upper and lower fixed electrodes are collectively called a fixed electrode 20. An upper amplitude detecting section 30*a* and a lower amplitude detecting section 30*b* are collectively called an amplitude detecting section 30. An upper voltage control section 40*a* and a lower voltage control section 40*b* are collectively called a voltage control section 40.

Figure 2A:
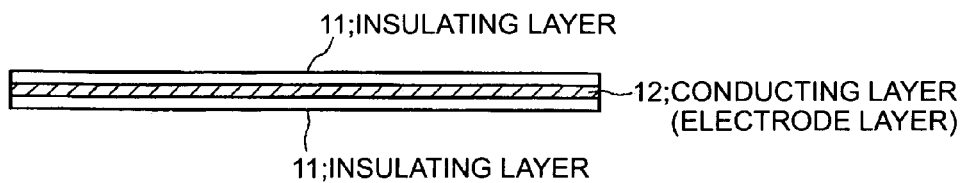
FIG. 2A is a diagram of a structural example of a vibrating electrode layer.
Figure 2B:
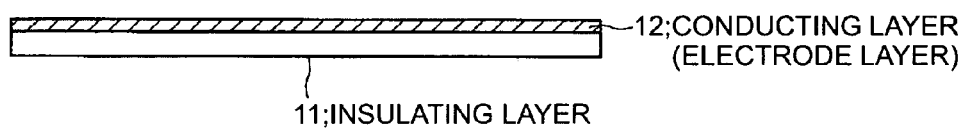
FIG. 2B is a diagram of a structural example of a vibrating electrode layer.
Figure 2C:
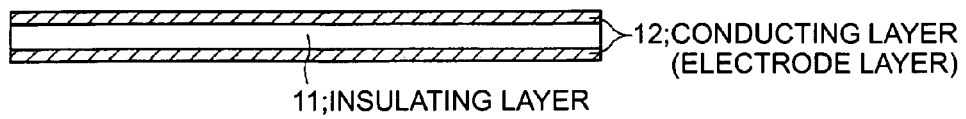
FIG. 2C is a diagram of a structural example of a vibrating electrode layer.

FIGS. 2A to 2C are diagrams showing structural examples of the diaphragm 10. The diaphragm (vibrating electrode layer) 10 shown in FIG. 2A has a structure in which a conducting layer (electrode layer) 12 is sandwiched between insulating layers 11. The diaphragm 10 shown in FIG. 2B has a structure in which one side of the insulating layer 11 is coated with the conducting layer (electrode layer) 12. The diaphragm 10 shown in FIG. 2C has a structure in which both sides of the insulating layer 11 are coated with the conducting layer (electrode layer) 12. When the diaphragms 10 shown in FIGS. 2B and 2C are used, it is desirable to provide an insulating layer on the fixed electrode 20 that faces the conducting layer (electrode layer) 12 of the diaphragm 10.

Referring again to FIG. 1, the fixed electrode 20 may have a plurality of electrode arrays that is insulated from one another. The fixed electrode 20 has through portions (through holes) for the sound waves generated from the diaphragm 10 to pass through. The through portions may be arranged between the array electrodes, or alternatively, may be through holes in the fixed electrode 20.

Parts of the vertically opposing electrode arrays of the fixed electrode 20 are used as the upper driving fixed electrode 21*a* and the lower driving fixed electrode 21*b*. To the upper driving fixed electrode 21*a*, the upper voltage control section 40*a* is connected and, to the lower driving fixed electrode 21*b*, the lower voltage control section 40*b* is connected, to both of which alternating current signals (driving signals) are applied.

The other parts of the electrode arrays of the fixed electrode 20 are used as the upper detecting fixed electrode 22*a* and the lower detecting fixed electrode 22*b*. To the upper detecting fixed electrode 22*a*, the upper amplitude detecting section 30*a* is connected and, to the lower detecting fixed electrode 22*b*, the lower amplitude detecting section 30*b* is connected, with which information on the vertical amplitude of the diaphragm 10 is obtained.

On the basis of the amplitude information obtained by the upper amplitude detecting section 30*a* and the lower amplitude detecting section 30*b*, the signals (drive voltages) to be applied to the upper driving fixed electrode 21*a* and the lower driving fixed electrode 21*b* are controlled so as to vibrate the diaphragm 10 vertically symmetrically, or in response to the (vertically) symmetrically positive and negative input signals. The details of the structure and the operation of the amplitude detecting section 30 and the voltage control section 40 will be described later.

The fixed electrode shown in FIG. 1 has a gap across between the diaphragm 10 and the fixed electrodes 20. Alternatively, the gaps between the diaphragm 10 and the upper and lower fixed electrodes 20 may not be provided. A fixed electrode with the gap is suitable for a loud speaker; a fixed electrode with a structure in which the diaphragm 10 is in contact with the fixed electrode 20 is suitable for an ultrasonic speaker.

In the example of FIG. 1, the detecting fixed electrode has a structure in which one upper detecting fixed electrode 22*a* is provided for the upper fixed electrode, while one lower detecting fixed electrode 22*b* is provided for the lower fixed electrode. Alternatively, multiple detecting fixed electrodes may be provided. In this case, the central portion where the maximum amplitude can be obtained can be used as the driving fixed electrode. The average of the amplitude voltages measured by the multiple detecting fixed electrodes is used as the amplitude output.

FIG. 1 shows the cross section of the ultrasonic transducer 1. The plan view of the fixed electrode may be circular, rectangular, or other various patterns. Also, the plan view of the through portion for a sound wave may be circular, rectangular, concentric circular ring, concentric rectangular ring, and other various patterns.

Figure 3:
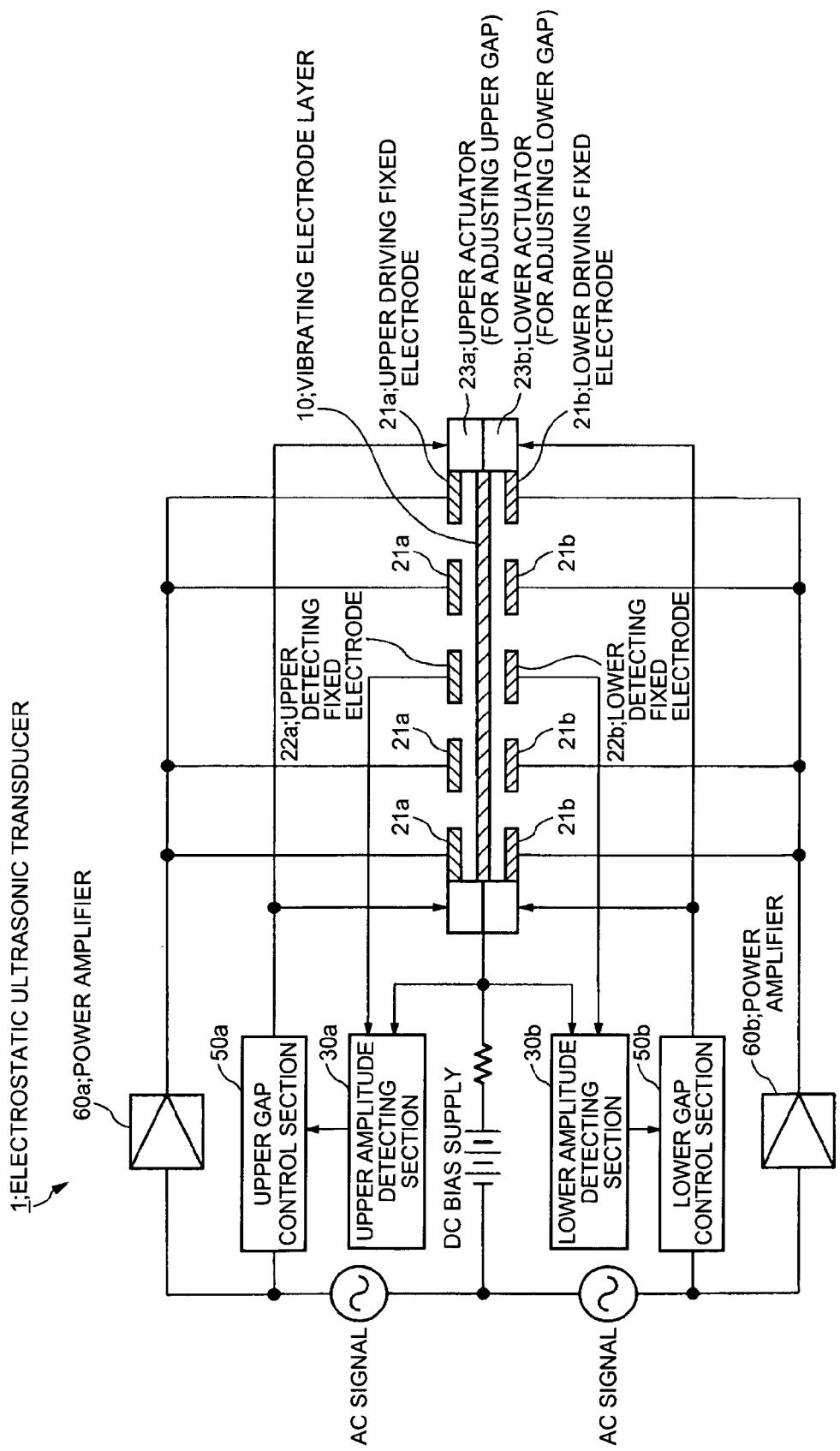
FIG. 3 is a diagram of a second structural example of the ultrasonic transducer according to the invention.

FIG. 3 is a diagram of a second structural example of the ultrasonic transducer 1, which further has an upper actuator 23*a* that adjusts the gap between the diaphragm 10 and the upper fixed electrodes (the upper driving fixed electrodes 21*a* and the upper detecting fixed electrode 22*a*) and a lower actuator 23*b* that adjusts the gap between the diaphragm 10 and the lower fixed electrodes (the lower driving fixed electrodes 21*b* and the lower detecting fixed electrode 22*b*).

In this example, the gaps are adjusted so that the diaphragm 10 vibrates with high fidelity to (in proportion to) the input signal, according to the information on the amplitude of the diaphragm 10 which is measured by the upper amplitude detecting section 30*a* and the lower amplitude detecting section 30*b*. The adjustment of the gaps are performed in response to the signals sent from an upper gap control section 50*a* and a lower gap control section 50*b* to the upper actuator 23*a* and the lower actuator 23*b* (the upper gap control section 50*a* and the lower gap control section 50*b* are collectively called a gap control section 50).

Figure 4:
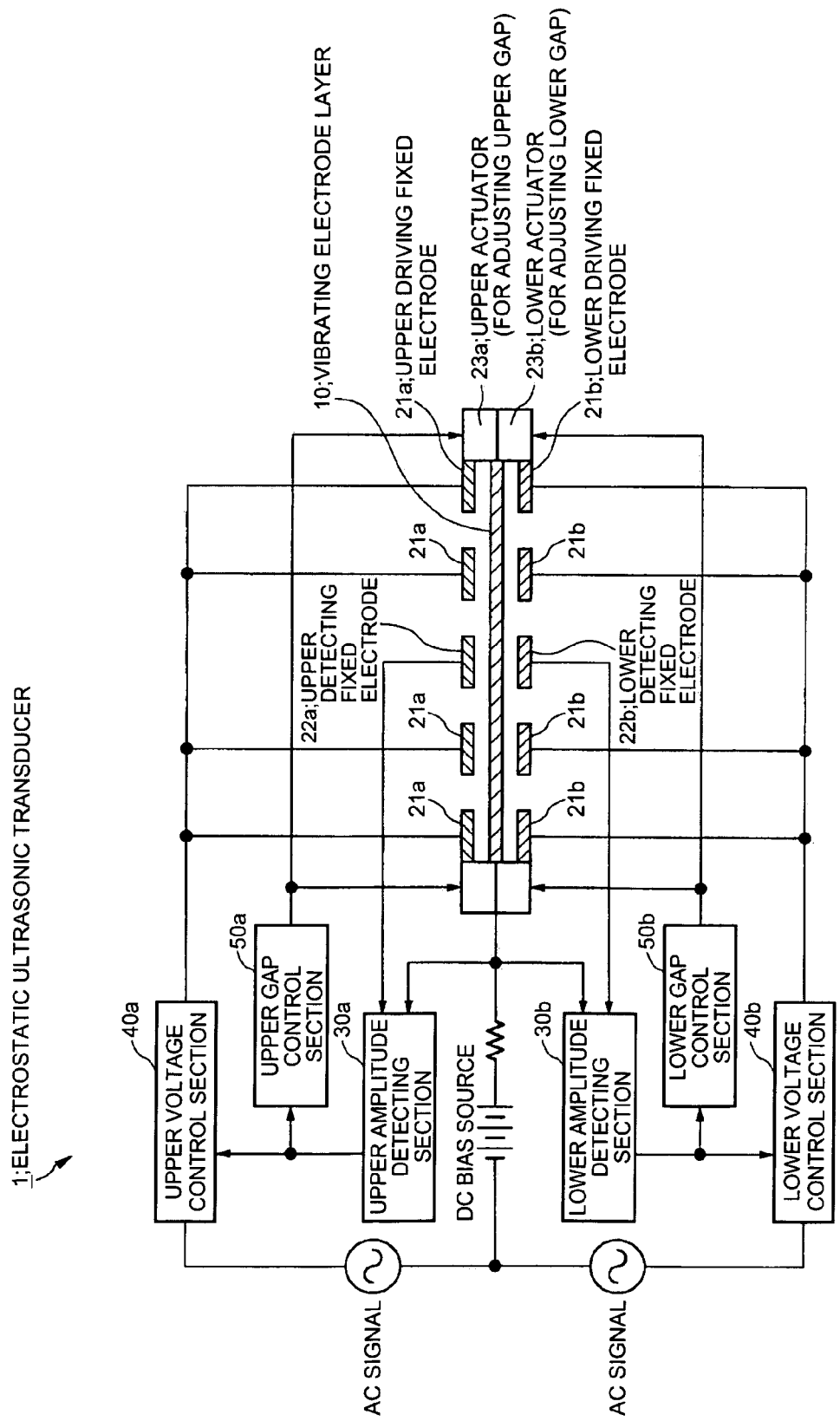
FIG. 4 is a diagram of a third structural example of the ultrasonic transducer according to the invention.

FIG. 4 is a diagram of a third structural example of the ultrasonic transducer 1, which has a combination structure of the function of the first ultrasonic transducer shown in FIG. 1 and the function of the second ultrasonic transducer shown in FIG. 3.

In the ultrasonic transducer 1 shown in FIG. 4, parts of the electrode arrays of the vertically opposing fixed electrode 20 are used as the upper driving fixed electrode 21*a* and the lower driving fixed electrode 21*b*. To the upper driving fixed electrode 21*a*, the upper voltage control section 40*a* is connected and, to the lower driving fixed electrode 21*b*, the lower voltage control section 40*b* is connected, to both of which driving signals are applied.

The other parts of the electrode arrays of the fixed electrode 20 are used as the upper detecting fixed electrode 22*a* and the lower detecting fixed electrode 22*b*. To the upper detecting fixed electrode 22*a*, the upper amplitude detecting section 30*a* is connected and, to the lower detecting fixed electrode 22*b*, the lower amplitude detecting section 30*b* is connected, with which information on the vertical amplitude of the diaphragm 10 is obtained.

On the basis of the amplitude information obtained by the upper amplitude detecting section 30a and the lower amplitude detecting section 30b, the signals (drive voltages) to be applied to the upper and lower fixed electrodes 20 are controlled by the upper voltage control section 40a and the lower voltage control section 40b so as to vibrate the diaphragm 10 vertically symmetrically.

The ultrasonic transducer 1 further includes the upper actuator 23a that adjusts the gap between the diaphragm 10 and the upper driving fixed electrodes 21a, and the lower actuator 23b that adjusts the gap between the diaphragm 10 and the lower driving fixed electrodes 21b, with which the gaps are adjusted so that the diaphragm 10 vibrates with high fidelity to (in proportion to) the input signals, according to the information on the amplitude of the diaphragm 10 which is obtained by the upper amplitude detecting section 30a and the lower amplitude detecting section 30b. The adjustment of the gaps are performed in accordance with the signals sent from the upper gap control section 50a and the lower gap control section 50b to the upper actuator 23a and the lower actuator 23b.

In this third structural example, the drive-voltage control by the voltage control section 40 and the gap control by the gap control section 50 are selectively used depending on the asymmetry of the upper amplitude and the lower amplitude of the diaphragm 10 which are detected by the upper amplitude detecting section 30a and the lower amplitude detecting section 30b.

For example, while the vertical asymmetry of the amplitude of the diaphragm 10 is larger than a specified value, the gap control by the gap control section 50 is selected; when the asymmetry becomes smaller than the specified value, the drive voltage control by the voltage control section 40 is selected.

Principle of Amplitude Detection and Structure and Operation of Amplitude Detecting Section The principle of amplitude detection is similar to that of a capacitor microphone. There is a capacitor between the diaphragm 10 and the detecting fixed electrode 22. Accordingly, when the diaphragm 10 vibrates to vary the gap between it and the detecting fixed electrode 22, the capacitance of the capacitor varies to change the electric charge in the capacitor. As a result, the voltage between the capacitor electrodes changes. Thus, the gap between the diaphragm 10 and the detecting fixed electrode 22, or the amplitude, can be determined by determining the voltage between the diaphragm 10 and the detecting fixed electrode 22.

Figure 5:
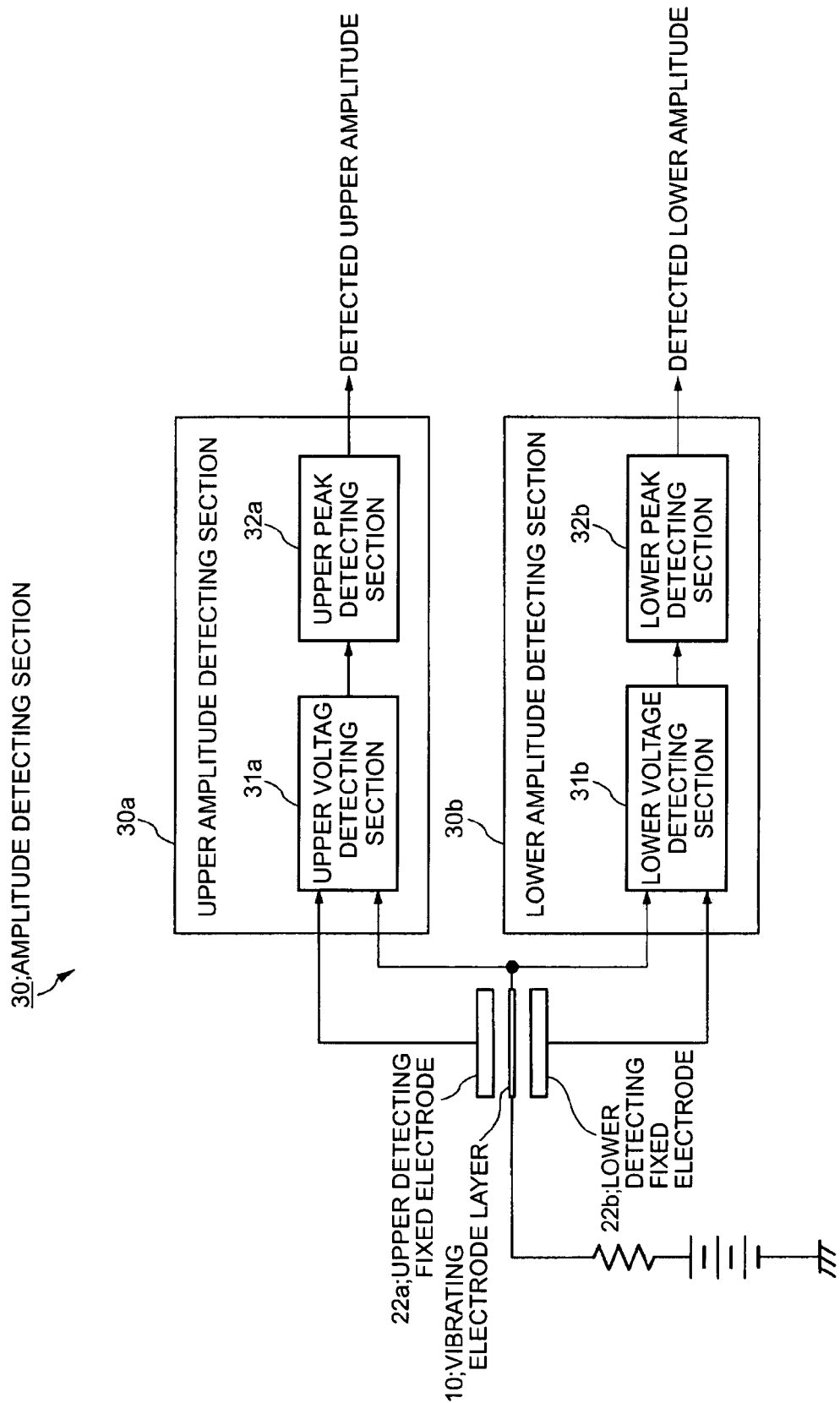
FIG. 5 is a diagram of a structural example of an amplitude detecting section.

FIG. 5 shows a structural example of the amplitude detecting section 30. The amplitude detecting section 30 is composed of the upper amplitude detecting section (first amplitude detecting means) 30a and the lower amplitude detecting section (second amplitude detecting means) 30b. The upper amplitude detecting section 30a determines the amplitude voltage between the diaphragm 10 and the upper detecting fixed electrode 22a by an upper voltage detecting section 31a and detects the maximum point of the detected voltage waveform by an upper peak detecting section 32a, thereby determining the upper amplitude of the diaphragm 10.

The lower amplitude detecting section 30b determines the voltage between the diaphragm 10 and the lower detecting fixed electrode 22b by a lower voltage detecting section 31b and detects the maximum point of the detected voltage waveform by a lower peak detecting section 32b, thereby determining the lower amplitude of the diaphragm 10.

The amplitude of the diaphragm 10 responsive to the positive and negative signals can thus be determined, allowing the asymmetrical distortion of the diaphragm 10 to be detected.

Structure and Operation of Voltage Control Section

Figure 6:
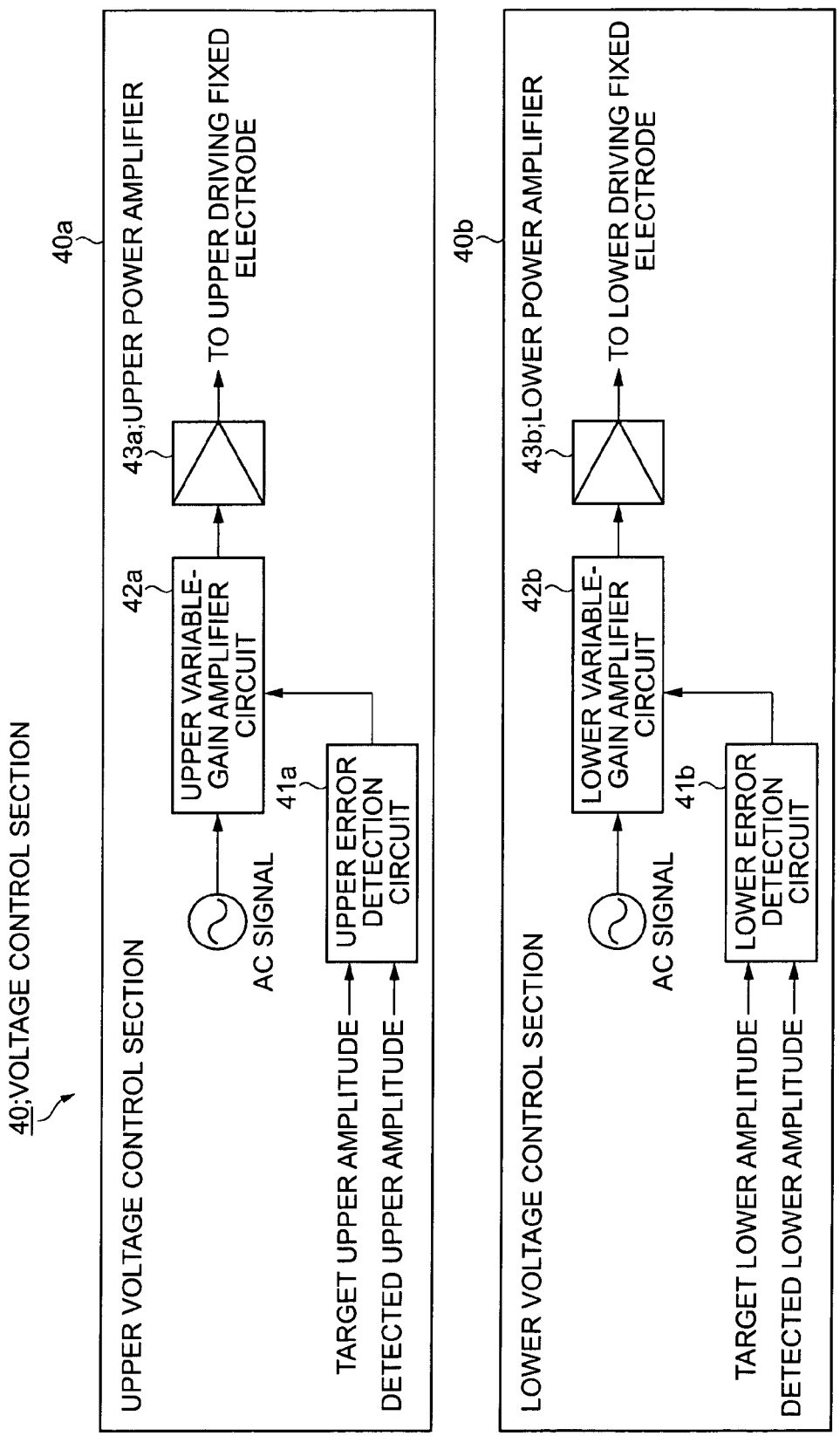
FIG. 6 is a diagram of a structural example of a voltage control section.

FIG. 6 shows a structural example of the voltage control section. The voltage control section 40 includes the upper voltage control section 40a and the lower voltage control section 40b corresponding to the upper amplitude detecting section 30a and the lower amplitude detecting section 30b (refer to FIG. 5), respectively. The upper voltage control section 40a and the lower voltage control section 40b have the same circuit structure.

An upper error detection circuit (first error detection means) 41a outputs the deviation of the amplitude (detected upper amplitude) of the diaphragm 10 which is detected by the upper amplitude detecting section 30a (refer to FIG. 5) relative to a target upper amplitude. A lower error detection circuit (second error detection means) 41b outputs the deviation of the amplitude (detected lower amplitude) of the diaphragm 10 which is detected by the lower amplitude detecting section 30b (refer to FIG. 5) relative to a target lower amplitude. The target amplitudes may be set in correspondence with the drive voltage in advance or, alternatively, may be set such that the amplitude determined by one detecting fixed electrode as the target amplitude of the opposing electrode.

An upper variable-gain amplifying circuit (a first variable-gain control means) 42a amplifies an alternating current signal (driving signal) while controlling the gain of the amplifying circuit depending on the deviation from the target amplitude outputted from the upper error detection circuit 41a. A lower variable-gain amplifying circuit (a second variable gain control means) 42b amplifies an alternating current signal (driving signal) while controlling the gain of the amplifying circuit depending on the deviation from the target amplitude outputted from the lower error detection circuit 41b. In this case, the gain is increased when the detected amplitude is smaller than the target amplitude (+deviation); the gain is decreased when it is larger (−deviation).

After the gain is thus controlled depending on the deviation in amplitude, the power is amplified by an upper power amplifier 43a and a lower power amplifier 43b, and the driving signal is supplied to the upper driving fixed electrode 21a and the lower driving fixed electrode 21b.

While the gain control by the upper variable-gain amplifying circuit 42a and the lower variable-gain amplifying circuit 42b is principally under automatic control (setting), it may be under manual control (setting). For example, factory-default manual control allows the ultrasonic transducer to be shipped in the optimum condition.

Structure and Operation of Gap Control Section

Figure 7:
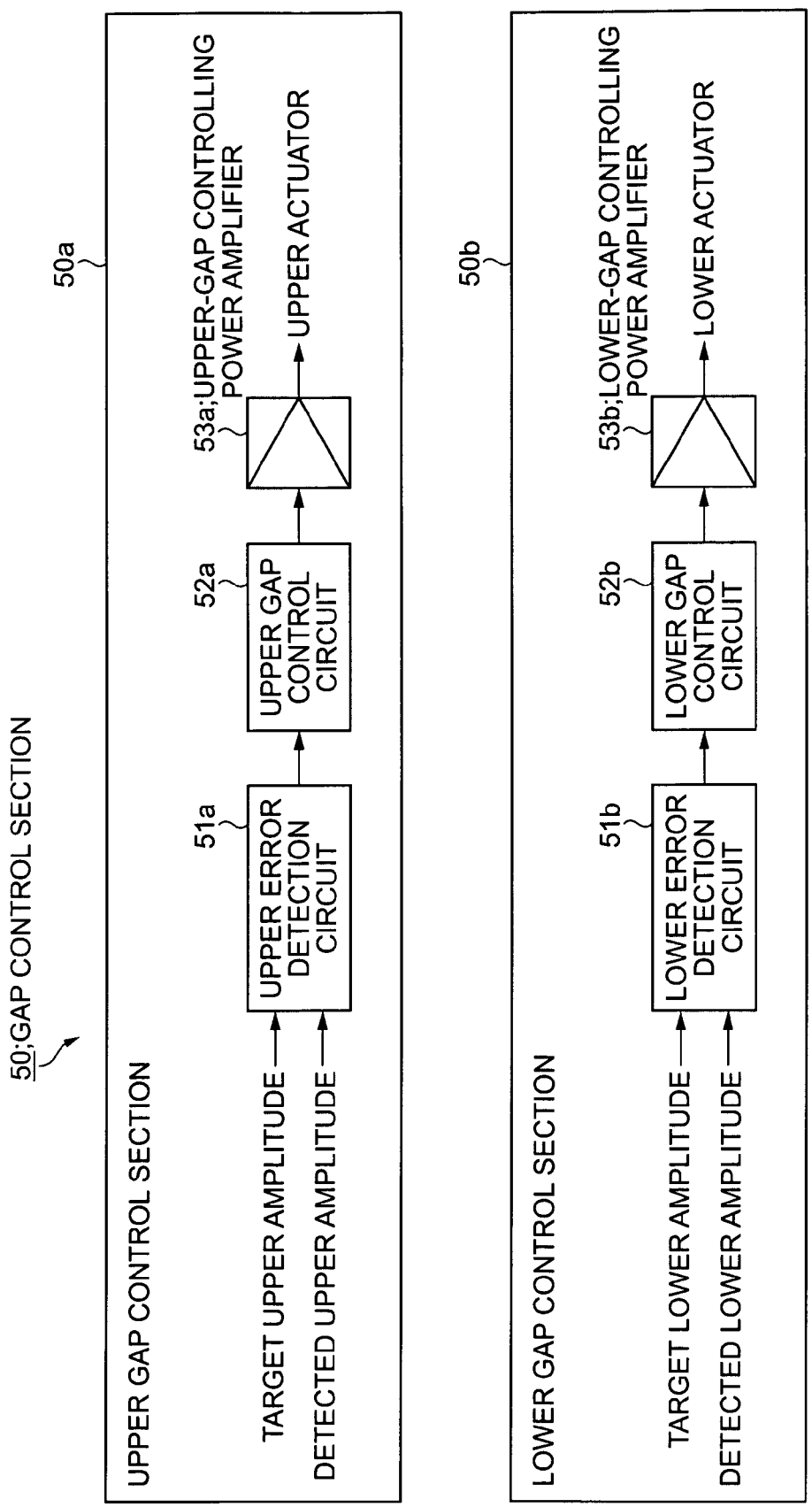
FIG. 7 is a diagram of a structural example of a gap control section.

FIG. 7 shows a structural example of the gap control section 50. The gap control section 50 includes the upper gap control section 50a and the lower gap control section 50b corresponding to the upper actuator 23a and the lower actuator 23b (refer to FIGS. 3 and 4), respectively. The upper gap control section 50a and the lower gap control section 50b have the same circuit structure.

An upper error detection circuit (first error detection means) 51a outputs the deviation of the detected upper amplitude of the diaphragm 10 relative to a target upper amplitude. A lower error detection circuit (second error detection means) 51b outputs the deviation of the detected lower amplitude of the diaphragm 10 relative to a target lower amplitude. The target amplitude may be set in correspondence with the drive voltage in advance or, alternatively, may be set such that the amplitude measured by one detecting fixed electrode as the target amplitude of the opposing electrode.

A gap control circuit (first gap control means) 52a controls the gap between the diaphragm 10 and the upper driving fixed electrode 21a via the upper actuator (actuator element) so that the deviation in amplitude (the output of the upper error detection circuit 51a) becomes zero. Similarly, a gap control circuit (second gap control means) 52b controls the gap between the diaphragm 10 and the lower driving fixed electrode 21b via the lower actuator (actuator element) so that the deviation in amplitude (the output of the lower error detection circuit 51b) becomes zero. As the upper gap control circuit 52a and the lower gap control circuit 52b, a PI controller or a PID controller can be used.

Figure 10:
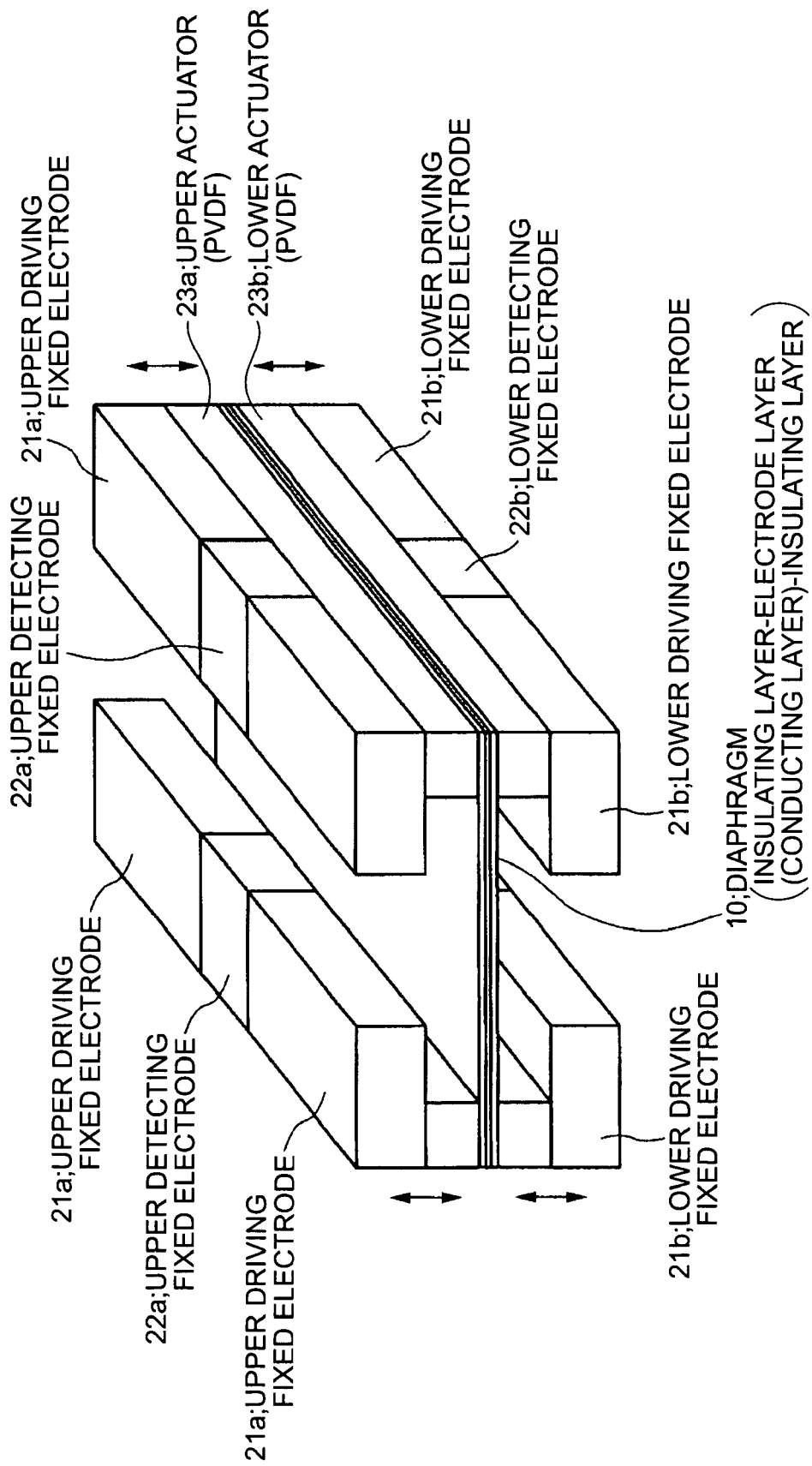
FIG. 10 is a diagram of a structural example of a fixed electrode with a structure in which the gap can be adjusted.
Figures 12A, 12B, 12C:
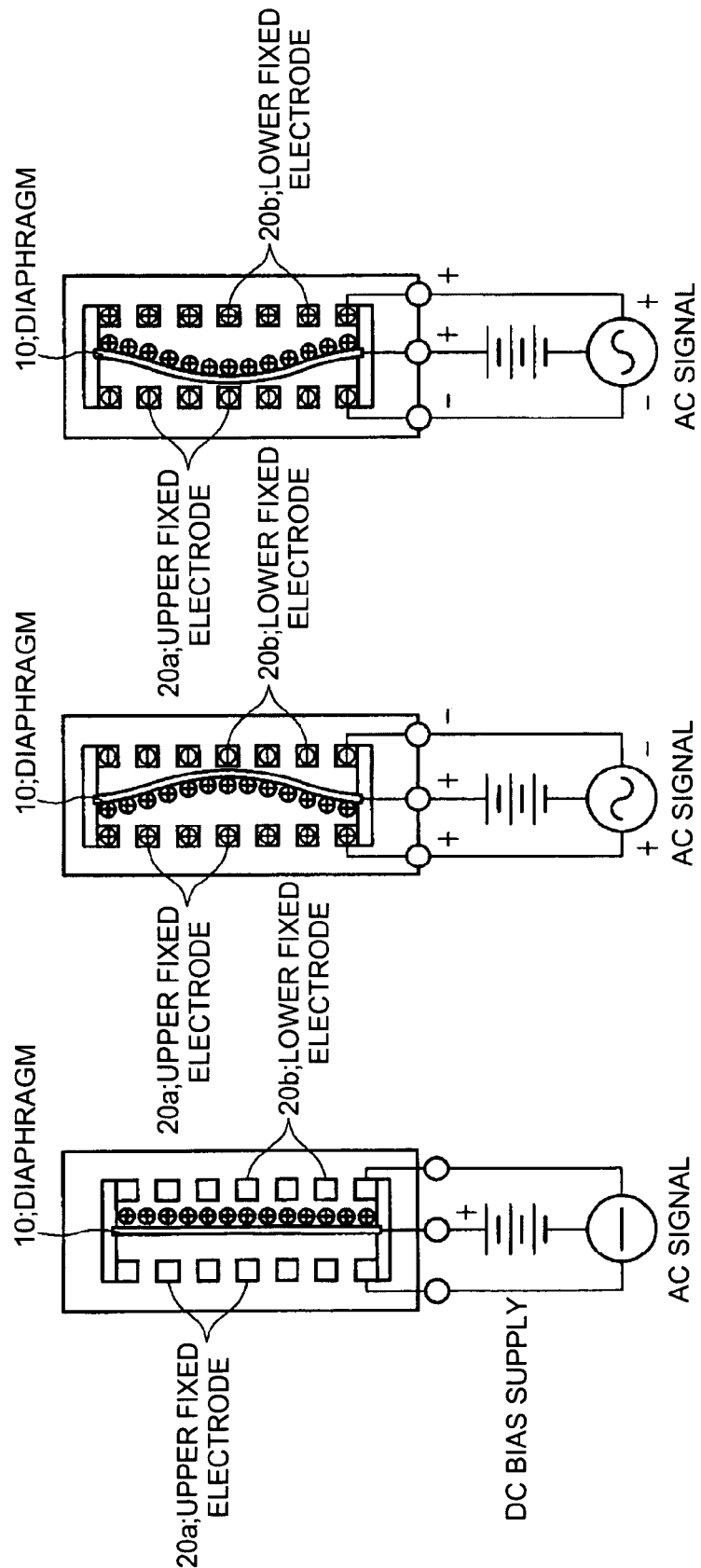
FIG. 12A is an explanatory diagram of the concept of driving a push-pull electrostatic ultrasonic transducer.
FIG. 12B is an explanatory diagram of the concept of driving a push-pull electrostatic ultrasonic transducer.
FIG. 12C is an explanatory diagram of the concept of driving a push-pull electrostatic ultrasonic transducer.
Figure 13:
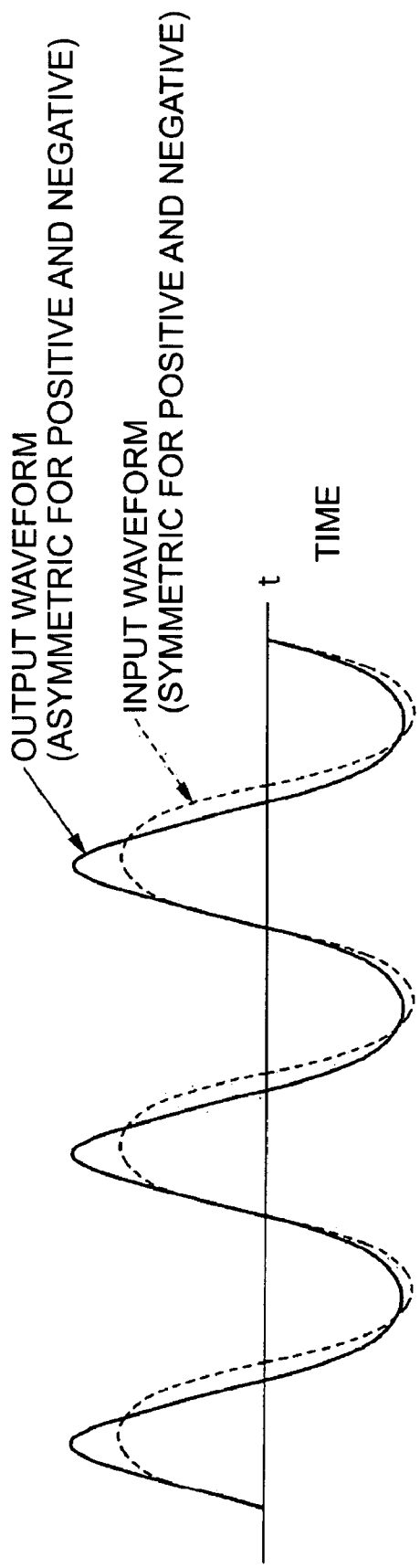
FIG. 13 is a diagram of an example of the vertically asymmetrical distortion of a vibration waveform.

FIG. 10 shows an example of the fixed electrode of the ultrasonic transducer in which the gaps can be controlled. As shown in FIG. 10, the actuator element (an upper actuator 23a and a lower actuator 23b) has a structure in which a film (planer) piezoelectric element such as a polyvinylidene fluoride (PVDF) resin is sandwiched between the diaphragm 10 and the upper driving fixed electrode 21a and between the diaphragm 10 and the lower driving fixed electrode 21b. The thickness of the PVDF film varies by controlling the voltage applied to the PVDF by the gap control section 50, allowing fine control of the gap. The piezoelectric element is provided only on the surface where the fixed electrode 20 is in contact with the diaphragm 10 so as not to interfere with the vibration of the diaphragm 10 and the radiation of sound waves. Other actuator means capable of fine control may also be used.

Although the ultrasonic transducers shown in FIGS. 3, 4, and 10 have a structure in which the upper and lower gap can be controlled individually, only one of the upper and lower gaps may be controlled.

Although the gap control by the upper gap control circuit 52a and the lower gap control circuit 52b is principally under automatic control (setting), it may be under manual control. For example, factory-default manual control allows the ultrasonic transducer to be shipped in the optimum condition.

Structural Example of Fixed Electrode of Ultrasonic Transducer

The fixed electrode 20 shown in FIG. 1 has a gap between the diaphragm 10 and the fixed electrode 20, thus having large vibration area and so is suitable for loud speakers with importance on reproduction in audible range. While FIG. 1 shows the cross section of the ultrasonic transducer 1, the plan view of the sound-wave through portion may be circular, rectangular, concentric circular ring, concentric rectangular ring, and other various patterns.

Figure 8:
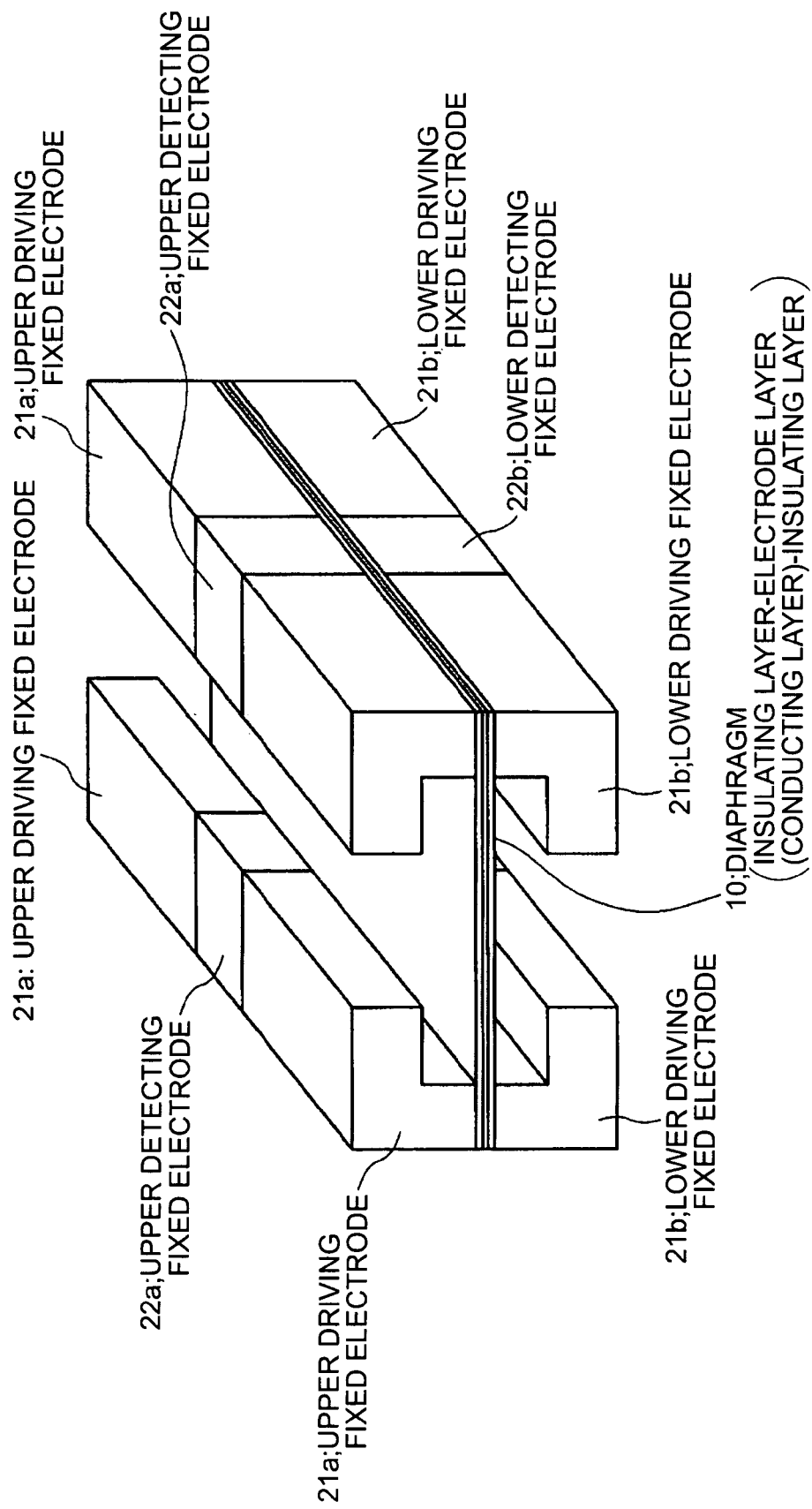
FIG. 8 is a diagram of a structural example of the fixed electrode of the ultrasonic transducer.

FIG. 8 shows a structural example of the fixed electrode 20 of the ultrasonic transducer, part of the fixed electrode being cut away, in which the double-side insulating diaphragm 10 is sandwiched between the fixed electrodes in contact therewith. The example of FIG. 8 shows part of an electrode array. Practically, the structure shown in FIG. 8 is arranged side by side. Since the structural example shown in FIG. 8 has a smaller vibrating area than that of the structure shown in FIG. 1, it is suitable for ultrasonic speakers.

In this case, structural examples of the vibrating electrode layer and the fixed electrode are as follows.

In the first case, the diaphragm 10 having both sides coated with an insulating layer is used (refer to FIG. 8).

In the second case, both sides of the diaphragm 10 are coated with an electrode layer, and the surfaces of the upper and lower fixed electrodes which face the diaphragm 10 have an insulating layer (not shown).

Figure 9:
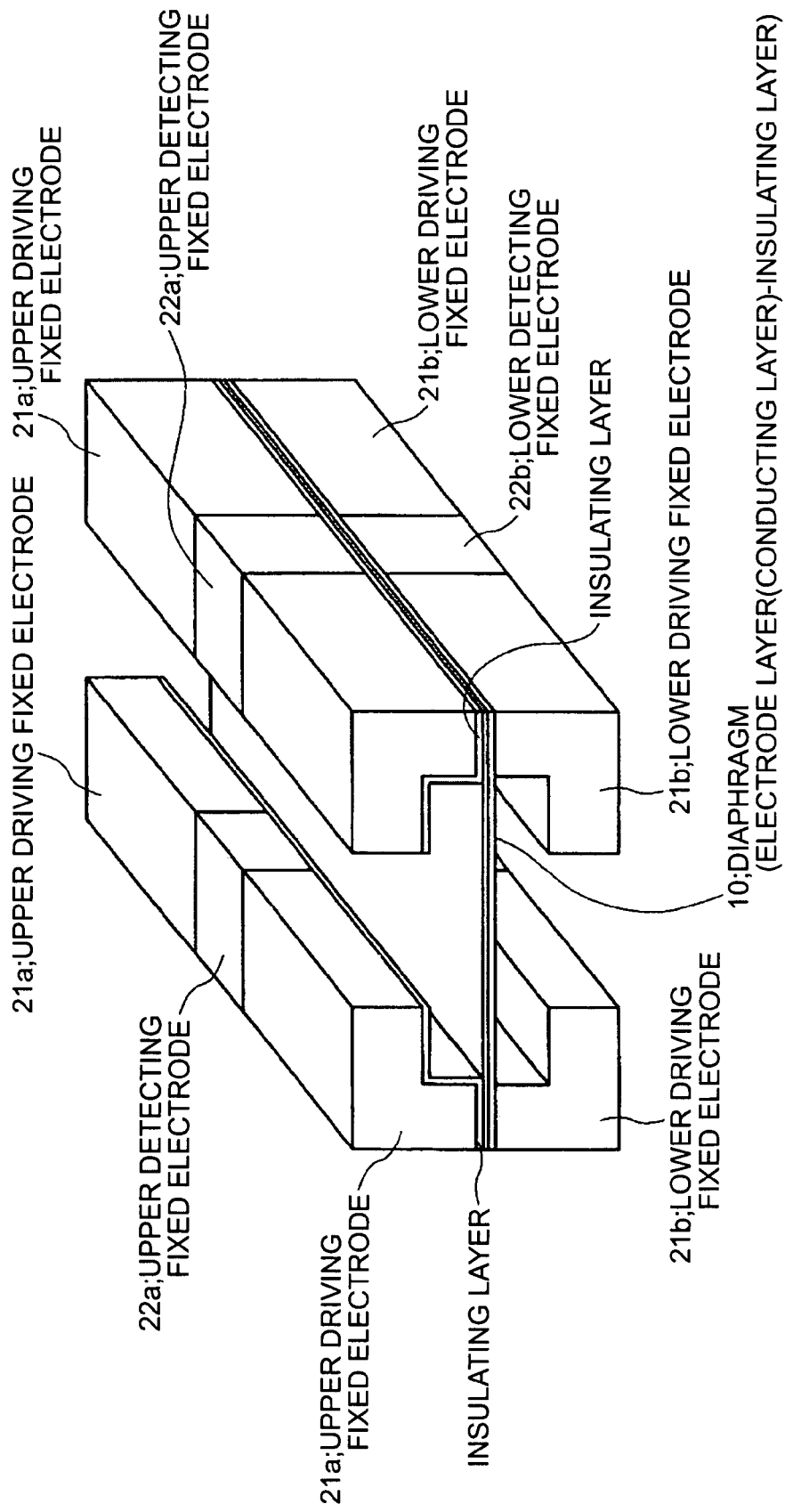
FIG. 9 is a diagram of another structural example of the fixed electrode of the ultrasonic transducer.

In the third case, as shown in FIG. 9, the diaphragm 10 is an insulating layer having one side coated with a conducting layer (electrode layer), and the surface of the fixed electrode which faces the conducting layer of the diaphragm 10 has an insulating layer.

Although the first case (the diaphragm having both sides coated with an insulating layer) is preferable in consideration of vertical symmetry, it is difficult to manufacture such a diaphragm. Two diaphragms of the third case (the diaphragm with an insulating layer having one side coated with a conducting layer) may be bonded together to form the diaphragm of the first case. However, it is difficult to bond them evenly, possibly causing local variations in the characteristic of the layer and providing little vertical symmetry. Also, a conductive adhesive agent should be used.

The second and third cases have no significant problem in manufacturing the diaphragm, because the technique of depositing the electrode layer on the surface of the insulating layer has already been established. Also, the technique of forming the insulating layer on the fixed electrode is present, so that there is no significant problem in manufacturing. However, the case of forming the insulating layer on the step-shaped fixed electrode has the problem of causing vertical asymmetry, because it is difficult to control the thickness with high accuracy.

Thus the structure of FIG. 8 tends to have a higher vertical asymmetry than that of the structure of FIG. 1 in terms of manufacturing. The invention allows the transducer with a vertical asymmetrical structure to be vibrated vertically symmetrically.

While the examples shown in FIGS. 8 and 9 have a rectangular sound-wave through portion, the through portion may be circular or other shapes. The cross section of the fixed electrode is in the form of a step to have large electrostatic force to be applied to the diaphragm 10. Alternatively, a tapered shape or a straight hole without the step is possible.

The invention has been described above based on embodiments. The configuration of the ultrasonic speaker using the ultrasonic transducer of the invention can suppress the asymmetrically positive and negative distortion when driving the transducer by a modulated wave generated by modulating an ultrasonic carrier wave by an audio-range signal, thereby reducing an audible component that is generated directly from the transducer. This allows a higher directivity ultrasonic speaker to be achieved.

While the invention has been described with reference to preferred embodiments, it is to be understood that the ultrasonic transducer of the invention is not limited to the foregoing embodiments, and that various modifications can be made without departing from the spirit and scope of the invention.

What is claimed is:
1. An electrostatic ultrasonic transducer comprising:
a diaphragm having a conducting layer; and
a pair of first and second fixed electrodes opposed to the corresponding surfaces of the diaphragm, the pair of fixed electrodes having a plurality of through holes in corresponding positions;
wherein a DC bias voltage is applied to the conducting layer of the diaphragm and an alternating current signal is applied between the first and second fixed electrodes to generate an ultrasonic wave;
part of the pair of fixed electrodes includes a driving fixed electrode for driving the ultrasonic transducer, and another part includes a detecting fixed electrode for detecting the amplitude of the diaphragm; and the ultrasonic transducer includes a control unit that controls the vibration of the diaphragm so that the amplitude of the diaphragm is proportional to the input signal on the basis of the amplitude of the diaphragm detected by the detecting fixed electrode.

2. The ultrasonic transducer according to claim 1, wherein:

each of the pair of fixed electrodes comprises an array of a plurality of electrodes that is insulated from one another, part of the electrode array serving as the driving fixed electrode, and another part of the fixed electrode serving as the amplitude-detecting fixed electrode.

3. The ultrasonic transducer according to claim 1, wherein:

the diaphragm has a structure in which both sides of a conducting electrode layer are coated with an insulating layer.

4. The ultrasonic transducer according to claim 1, wherein:

the diaphragm has a structure in which at least one side of the diaphragm is coated with a conducting layer and a surface of the fixed electrode which faces the conducting layer of the diaphragm has an insulating layer.

5. The ultrasonic transducer according to claim 1, further comprising:

a first amplitude detection unit that detects the amplitude voltage level of the diaphragm for the first fixed electrode by measuring the voltage between the detecting fixed electrode of the first fixed electrode of the pair of fixed electrodes and the diaphragm; and a second amplitude detection unit that detects the amplitude voltage level of the diaphragm for the second fixed electrode by measuring the voltage between the detecting fixed electrode of the second fixed electrode of the pair of fixed electrodes and the diaphragm.

6. The ultrasonic transducer according to claim 5, further comprising:

a first error detection unit that detects the error between the amplitude voltage level detected by the first amplitude detection unit and a target voltage level;

a second error detection unit that detects the error between the amplitude voltage level detected by the second amplitude detection unit and a target voltage level;

a first variable-gain control unit that controls the gain of the alternating current signal applied to the driving fixed electrode of the first fixed electrode based on the error detected by the first error detection unit; and a second variable-gain control unit that controls the gain of the alternating current signal applied to the driving fixed electrode of the second fixed electrode based on the error detected by the second error detection unit.

7. An ultrasonic transducer comprising:

a diaphragm having a conducting layer; and a pair of first and second fixed electrodes opposed to corresponding surfaces of the diaphragm, the pair of fixed electrodes having a plurality of through holes in corresponding positions;

wherein a DC bias voltage is applied to the conducting layer of the diaphragm and an alternating current signal is applied between the first and second fixed electrodes to generate an ultrasonic wave;

part of the pair of fixed electrodes includes a driving fixed electrode for driving the ultrasonic transducer, and another part includes a detecting fixed electrode for detecting the amplitude of the diaphragm; and the ultrasonic transducer includes a control unit that controls the vibration of the diaphragm so that the amplitude of the diaphragm is proportional to the input signal by adjusting gaps between the first and second fixed electrodes and the diaphragm on the basis of the amplitude of the diaphragm detected by the detecting fixed electrode.

8. The ultrasonic transducer according to claim 7, wherein:

each of the pair of fixed electrodes comprises an array of a plurality of electrodes that is insulated from one another, part of the electrode array serving as the driving fixed electrode, and another part of the fixed electrode serving as the amplitude-detecting fixed electrode.

9. The ultrasonic transducer according to claim 7, wherein:

the diaphragm has a structure in which both sides of a conducting electrode layer are coated with an insulating layer.

10. The ultrasonic transducer according to claim 7, wherein:

the diaphragm has a structure in which at least one side of the diaphragm is coated with a conducting layer and a surface of the fixed electrode which faces the conducting layer of the diaphragm has an insulating layer.

11. The ultrasonic transducer according to claim 7, further comprising:

a first amplitude detection unit that detects the amplitude voltage level of the diaphragm for the first fixed electrode by measuring the voltage between the detecting fixed electrode of the first fixed electrode of the pair of fixed electrodes and the diaphragm;

a second amplitude detection unit that detects the amplitude voltage level of the diaphragm for the second fixed electrode by measuring the voltage between the detecting fixed electrode of the second fixed electrode of the pair of fixed electrodes and the diaphragm;

a first error detection unit that detects the error between the amplitude voltage level detected by the first amplitude detection unit and a target voltage level;

a second error detection unit that detects the error between the amplitude voltage level detected by the second amplitude detection unit and a target voltage level;

a first gap control unit that adjusts the gap between the first fixed electrode and the diaphragm by an actuator on the basis of the error detected by the first error detection unit; and a second gap control unit that adjusts the gap between the second fixed electrode and the diaphragm by an actuator on the basis of the error detected by the second error detection unit.

12. The ultrasonic transducer according to claim 7, further comprising:

a first amplitude detection unit that detects the amplitude voltage level of the diaphragm for the first fixed electrode by measuring the voltage between the detecting fixed electrode of the first fixed electrode of the pair of fixed electrodes and the diaphragm;

a second amplitude detection unit that detects the amplitude voltage level of the diaphragm for the second fixed electrode by measuring the voltage between the detecting fixed electrode of the second fixed electrode of the pair of fixed electrodes and the diaphragm;

a first error detection unit that detects the error between the amplitude voltage level detected by the first amplitude detection unit and a target voltage level;

a second error detection unit that detects the error between the amplitude voltage level detected by the second amplitude detection unit and a target voltage level;

a first variable-gain control unit that controls the gain of the alternating current signal applied to the driving fixed electrode of the first fixed electrode when the error detected by the first error detection unit is lower than a specified value;

a second variable-gain control unit that controls the gain of the alternating current signal applied to the driving fixed electrode of the second fixed electrode when the error detected by the second error detection unit is lower than a specified value;

a first gap control unit that adjusts the gap between the first fixed electrode and the diaphragm by an actuator when the error detected by the first error detection unit is higher than a specified value; and a second gap control unit that adjusts the gap between the second fixed electrode and the diaphragm by an actuator when the error detected by the second error detection unit is higher than a specified value.

13. An ultrasonic speaker comprising:

the ultrasonic transducer according to claim 1, wherein a modulated wave is able to be generated by modulating the amplitude of an ultrasonic carrier wave by an audio-range signal.

14. A method of controlling the driving of an electrostatic ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave, the method comprising:

forming part of the pair of fixed electrodes as a driving fixed electrodes for driving the ultrasonic transducer, and another part as a detecting fixed electrode for detecting the amplitude of the diaphragm; and controlling the ultrasonic transducer so that the diaphragm vibrates such that the amplitude is proportional to the input signal based on the amplitude of the diaphragm detected by the detecting fixed electrode.

15. A method of controlling the driving of an electrostatic ultrasonic transducer including a diaphragm having a conducting layer and a pair of first and second fixed electrodes opposed to the corresponding surfaces of the diaphragm, the pair of fixed electrodes having a plurality of through holes in corresponding positions, wherein a DC bias voltage is applied to the conducting layer of the diaphragm and an alternating current signal is applied between the first and second fixed electrodes to generate an ultrasonic wave, the method comprising:

forming part of the pair of fixed electrodes as a driving fixed electrodes for driving the ultrasonic transducer, and another part as a detecting fixed electrode for detecting the amplitude of the diaphragm; and controlling the ultrasonic transducer so that the diaphragm vibrates such that the amplitude is proportional to the input signal by adjusting the gaps between the first and second fixed electrodes and the diaphragm on the basis of the amplitude of the diaphragm detected by the detecting fixed electrode.

* * * * *